Feb. 21, 1961  S. R. ZIMMERLEY ET AL  2,972,531
PROCESS FOR PRODUCTION OF ULTRA-HIGH PURITY RHENIUM
Filed April 18, 1958
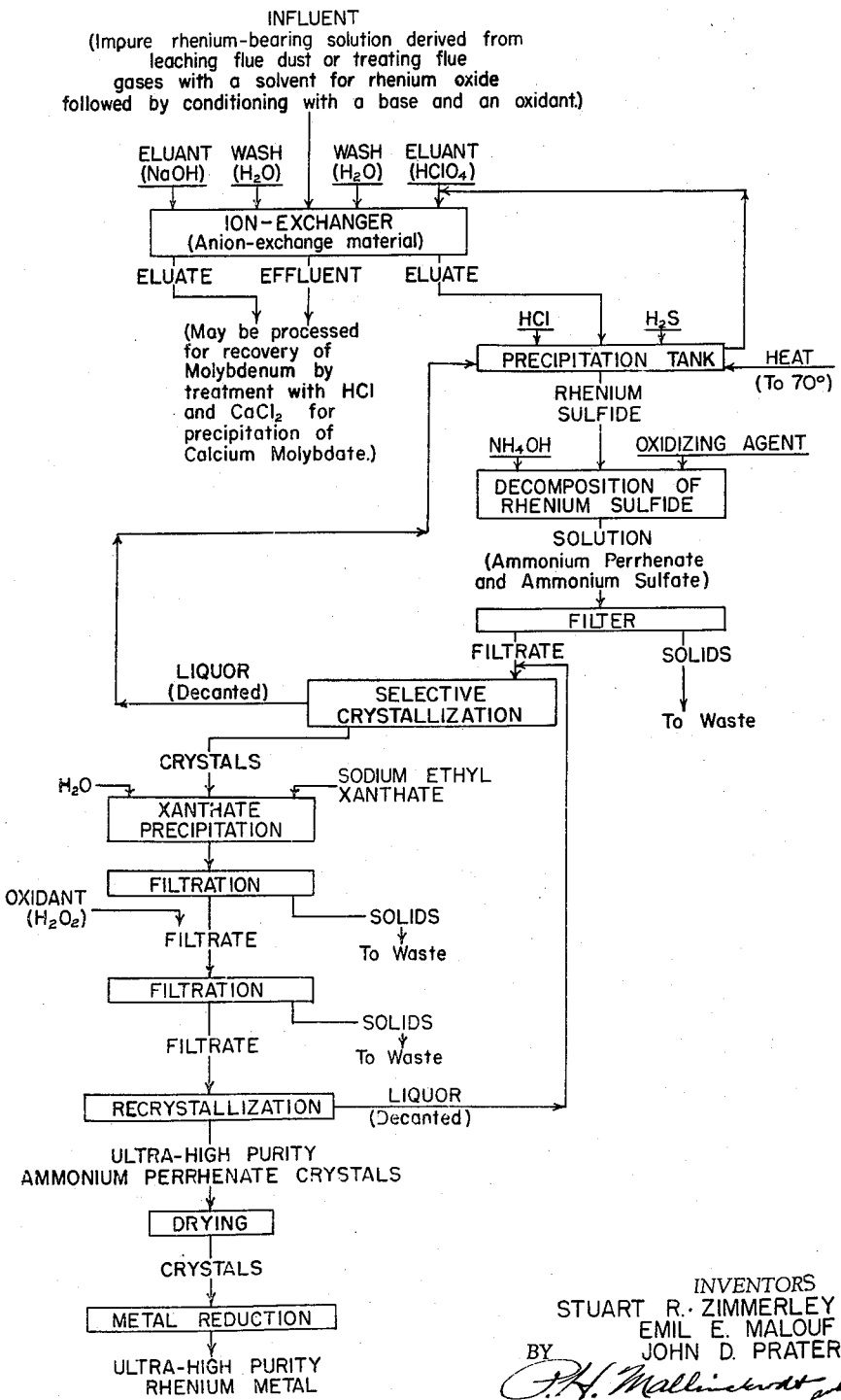
INVENTORS
STUART R. ZIMMERLEY
EMIL E. MALOUF
JOHN D. PRATER
BY
ATTORNEYS

United States Patent Office 2,972,531
Patented Feb. 21, 1961

2,972,531

PROCESS FOR PRODUCTION OF ULTRA-HIGH PURITY RHENIUM

Stuart R. Zimmerley, Emil E. Malouf, and John D. Prater, Salt Lake City, Utah, assignors to Kennecott Copper Corporation, New York, N.Y., a corporation of New York Filed Apr. 18, 1958, Ser. No. 729,390

12 Claims. (Cl. 75—121)

This invention relates to the production of rhenium and rhenium compounds of ultra-high purity, and is especially concerned with effectively removing substantially all contaminating metal ions from a rhenium source material already highly purified with respect to metallic contaminants.

It is shown by U.S. Patent No. 2,809,092, granted October 8, 1957, to Stuart R. Zimmerley and Emil E. Malouf, how a maximum of the rhenium content of rhenium-bearing, molybdenum sulfide, metallurgical concentrates may be effectively recovered in a usefully pure form as an incident to the industrial production of molybdenum oxide by the roasting of such concentrates.

In copending application Serial Number 717,997, filed February 27, 1958 by Stuart R. Zimmerley and John D. Prater, now U.S. Patent No. 2,945,743, there is disclosed an improvement on the purification procedure of that patented process, and, in the earlier but presently copending application of the same applicants, Serial Number 500,395, filed April 11, 1955, now U.S. Patent No. 2,876,065, there is disclosed a closely related process for producing high purity rhenium compounds, especially ammonium perrhenate, leading to the production of high purity rhenium metal.

Considerable interest has been shown recently in rhenium metal for high temperature applications requiring, for example, the drawing of such metal into wire. However, the malleability of rhenium is very sensitive to the presence of extremely small amounts of other metals, and, unless those other metals are substantially all removed, embrittlement occurs during working.

While the ammonium perrhenate of the last-named copending application Serial Number 500,395 and the rhenium metal produced therefrom are normally of ultra-high purity, we have found from pilot plant operations that significant contamination can take place for one reason or another during the course of the process or that there can be a failure to remove substantially all of the contaminants by reason of human error in control. Under such circumstances, the rhenium metal becomes undesirably brittle and cannot be successfully worked.

The present invention successfully solves this problem of uncertainty as to the degree of purity of the final product of such copending application Serial Number 500,395 by providing a procedure which, when used in the process of that application, insures the required ultra-high purity regardless of circumstances.

Accordingly, while a principal object of the invention is to provide a quantitative method for removing substantially all metallic contaminants from a rhenium material of high purity, another object is to improve the process of copending application Serial Number 500,395 by eliminating doubt as to the ultra-high purity of the final product.

In addition, even though an ultra-high purity rhenium metal is obtained, scrap resulting from the working of the metal has been found to be contaminated with minor metallic impurities picked up from the fabricating tools, lubricants, etc. Such scrap may be relieved of these impurities by use of the present invention.

The method or process that we have developed depends on our discovery that, contrary to generally accepted teaching, rhenium is not precipitated from a solution by the introduction into such solution of a soluble xanthate salt as a precipitant for metallic ions. Accordingly, our invention involves the preferential precipitation of various contaminating metal ions from a rhenium-bearing solution, leaving the rhenium in solution.

Additional objects and features of the invention will become apparent from the following detailed description of preferred specific procedures.

In carrying out the present process, a quantitative removal of substantially all of various metallic impurities from a rhenium material of high purity is effected by introducing a soluble xanthate salt into a neutral or slightly basic aqueous solution of such rhenium material. The xanthate precipitant will ordinarily be an alkali alkyl xanthate, preferably sodium ethyl-xanthate, but any soluble xanthate salt may be used which conforms to the general structural formula

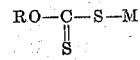

where R is an alkyl group and M is any metal which forms a water-soluble xanthate. Thus, appropriate metal xanthates based on methyl, ethyl, propyl, butyl, amyl, and isomers may be utilized. While it is appreciated that the solubility of alkyl xanthate metal salts decreases in water as the molecular weight of the alcohol increases, it should be remembered that the total amount of contaminants to be removed is generally small and, therefore, not much of the xanthate salt is required to precipitate the contaminants.

A stoichiometric excess of the xanthate required to precipitate the metallic impurities, e.g. 10% excess, is added to the solution, and the precipitate is formed while the solution is undergoing agitation. Such impurities are precipitated with substantially no loss of rhenium.

When ammonium perrhenate, which has been produced by treatment of a highly contaminated rhenium-oxide solution derived as taught by the aforementioned Patent No. 2,809,092, is treated in accordance with this invention, the xanthate precipitate will ordinarily contain copper as a principal constituent, along with such other elements as silver, aluminum, arsenic, barium, calcium, cobalt, chromium, iron, indium, manganese, magnesium, molybdenum, sodium, nickel, lead, antimony, silicon, tin, titanium, and vanadium. Even though certain elements, such as silicon and aluminum, do not form insoluble xanthates and would not be expected to precipitate out, they are definitely removed by our xanthate precipitation procedure. Formation of insoluble xanthates of heavy metals, particularly copper, apparently has the effect of removing other elements that are not in and of themselves precipitated by xanthate. In fact, we have found that, where a contaminated rhenium-bearing material to be purified contains substantially no copper, it may be desirable to add some copper to the solution during the purifying treatment in order to insure the removal of other metallic contaminants normally difficult or impossible to remove by themselves. The amount of copper which may be added for this purpose ranges from the spectroscopic up to about five milligrams per liter.

The quantity of xanthate required in any given instance is dependent upon the extent of metallic contamination of the perrhenate solution. However, an excess of the xanthate merely means that some remains in the clear filtrate. By adding hydrogen peroxide or some other oxidizing agent and thereafter heating the filtrate solution to boiling the excess xanthate is decomposed. Any precipitate that may form as a result of the oxidizing treatment is then removed by filtration.

The contaminated solution should be cool when the xanthate is added, e.g. at room temperature, to preclude any possibility of xanthate decomposition. Also, for the same reason, such solution should be neutral or slightly on the basic side.

Among the xanthates indicated as precipitants it is wise to avoid those containing potassium. This is true because the potassium would form the relatively insoluble potassium perrhenate, which, if recovered with the ammonium perrhenate, would introduce potassium metal in the final rhenium metal.

Our present method of precipitating metallic contaminants from a perrhenate solution, preferentially as respects rhenium, is advantageously employed in the process of the aforementioned application Serial Number 500,395, to insure the obtaining of ultra-high purity rhenium regardless of the circumstances.

Thus, as indicated by the flow sheet of the accompanying drawing, a rhenium-oxide-containing effluent obtained from the roasting of a suitable molybdenum sulfide metallurgical concentrate is treated with an aqueous solvent to dissolve the rhenium oxide and to thereby form a highly impure rhenium-bearing solution.

Following conditioning and clarification of such impure solution as disclosed in the aforementioned application Serial Number 717,997, it is passed through conventional ion exchange equipment in intimate contact with a suitable anion exchange material, for example, a strongly basic, alkyl amine type of synthetic resin, such as that known commercially by the name "Amberlite IRA–400." An optimum rate is ½ gallon per cubic foot of resin per minute. Faster rates are not so advantageous from the standpoint of results.

When the rhenium breakthrough point is reached, that is to say, when rhenium is present in the effluent from the exchange column, the exchange material is rinsed with water to remove any influent solution which may be retained mechanically in the interstices.

The molybdenum and any other minor impurities, such as arsenic and selenium which may have been retained by the exchange material, are eluted by passing an alkaline hydroxide eluant, for example a solution of sodium hydroxide (200 grams of sodium hydroxide per liter of solution), through the column.

Following such elution, the exchange material is again rinsed with water for the purpose of removing any retained hydroxide.

The adsorbed rhenium is removed from the exchange material by elution with preferably perchloric acid. This acid in concentrations as low as 0.5 molar and in relatively small volume effects complete removal of the rhenium.

Other strong acids highly ionized in aqueous solution are effective for the purpose, for example, hydrochloric, nitric, or sulfuric acid, but are not as desirable as the perchloric acid because of their larger volume in the stronger concentrations necessary for the purpose.

An optimum rate for both eluants is 1/10 of a gallon per cubic foot of resin per minute.

While an essentially similar ion exchange technique has been carried out in the laboratory on an analytical basis and utilizing analytical grades of sodium molybdate and potassium perrhenate in a dilute caustic solution, it has been found that the presence of chloride and sulfate ions in the influent solution to the extent unavoidably resulting from leaching flue dusts and scrubbing the gaseous effluent from roaster operations does not prevent commercially feasible rhenium recovery.

Rhenium sulfide ($Re_2S_7$) is precipitated from the relatively pure rhenium-bearing perchloric acid solution by the introduction thereinto of a sulfide, for example, by bubbling hydrogen sulfide gas therethrough. Since the perchloric acid solution and the $H_2S$ gas are practically free from impurities, the rhenium sulfide is in a very pure state. It is separated from the solution in any convenient manner, advantageously by filtration.

When some other sulfide-forming precipitant, such as sodium sulfide, is used in place of $H_2S$ gas, great care should be taken as to its purity. Otherwise, impurities will be introduced and co-precipitated with the rhenium. A very advantageous sulfide-forming precipitant that may be used more conveniently than the $H_2S$ gas and without introducing impurities is thioacetamide.

For effective precipitation, the acidity of the solution should be increased. Accordingly, before introduction of the sulfide, an acid is added to the extent of approximately 7% by weight. Hydrochloric acid is preferred for this purpose, but sulfuric and other inorganic acids may be utilized with almost equal effectiveness. Precipitation is facilitated also by heating the solution to approximately 70 degrees Centigrade. Under these conditions the sulfide precipitate coagulates well and can be readily filtered and washed.

The rhenium sulfide so obtained is decomposed by ammonium hydroxide in the presence of an oxidizing agent, such as hydrogen peroxide, oxygen under conditions of elevated temperature and pressure, etc., resulting in ammonium perrhenate and ammonium sulfate in solution.

Since some residual sulfur remains after decomposition of the sulfide, the solution is treated for its elimination prior to recovery of the ammonium perrhenate. As indicated in the flow sheet, filtration is a preferred way of accomplishing this.

The ammonium perrhenate is then selectively crystallized from the filtrate solution, as by evaporation and cooling. The mother liquor is separated from the crystals by decantation, filtration, or both, and is returned to the rhenium sulfide precipitation stage for recovery of any remaining rhenium. Repeated tests have shown that over 90% of the rhenium is crystallized out in this manner, leaving less than 10% to be recycled.

The selective crystallization of the ammonium perrhenate is advantageously carried out by boiling the filtrate solution until it contains approximately 350 to 400 grams of ammonium perrhenate per liter, and then agitating the solution while permitting it to cool to room temperature.

The ammonium perrhenate crystals could be redissolved in distilled water and subjected to recrystallization, as in Serial Number 500,395 without further processing; but to insure ultra-high purity, they are dissolved in water, and the xanthate precipitant, preferably sodium ethyl-xanthate, as indicated, added in an amount in stoichiometric excess of the total metallic contaminants present, such contaminants being brought down as xanthate precipitate while the solution is being agitated. The precipitated contaminants are removed by filtering, the filtrate treated with an oxidant, ordinarily hydrogen peroxide, as indicated, to decompose any xanthate remaining, this solution filtered, and the filtrate subjected to recrystallization in the same manner, yielding ammonium perrhenate crystals of exceptionally high purity, which are dried and reduced to rhenium metal, as by hydrogen reduction, if that is the desired end product. Both the crystals and the metal may be appropriately said to be of ultra-high purity.

In a particular instance serving as a typical example, ammonium perrhenate crystals were produced by the foregoing procedure up to the xanthate stage. They were found to be off-grade with respect to copper and barium due to mishandling of the ion-exchange equipment. Spectrographic analysis of these crystals showed metallic contamination as follows:

TABLE I

*Spectrographic analysis of ammonium perrhenate before xanthate treatment*

[Composition in terms of percent weight]

| | | |
|---|---|---|
| Ag—not detected | Hg—not detected | Rh—not detected |
| Al—.006 | In—not detected | Ru—not detected |
| As—not detected | Ir—not detected | Sc—not detected |
| Au—not detected | K—less than .005 | Si—.01 |
| B—not detected | La—not detected | Sn—not detected |
| Ba—.01 | Li—not detected | Sr—not detected |
| Be—not detected | Mg—.005 | Ta—not detected |
| Bi—not detected | Mn—not detected | Te—not detected |
| Ca—.005 | Mo—.005 | Th—not detected |
| Cd—not detected | Na—less than .005 | Ti—less than .0001 |
| Ce—not detected | Nb—not detected | Tl—not detected |
| Co—not detected | Ni—not detected | U—not detected |
| Cr—not detected | Os—not detected | V—not detected |
| Cs—not detected | P—not detected | W—not detected |
| Cu—.01 | Pb—not detected | Y—not detected |
| Fe—less than .005 | Pd—not detected | Zn—not detected |
| Ga—not detected | Pt—not detected | Zr—not detected |
| Ge—not detected | Rb—not detected | |
| Hf—not detected | Re—principal constituent | |

In applying the aforedescribed xanthate purification procedure to these off-grade ammonium perrhenate crystals, respective batches were treated. For each batch, six liters of pregnant solution were prepared by dissolving 600 grams of the crystals in distilled water made slightly ammoniacal with ammonium hydroxide. To the prepared solution was added 100 ml. of sodium ethyl xanthate ($CH_3CH_2OCSSNa$) solution made up by dissolving one gram of the xanthate salt in 100 ml. of distilled water and filtering. After the addition of the xanthate, a precipitate formed and was filtered off. The same procedure was repeated until no further precipitate formed. The clear filtrate was then evaporated and cooled, to crystallize out the ammonium perrhenate as ultra-high purity ammonium perrhenate.

Spectrographic analysis of the thus purified, originally off-grade, ammonium perrhenate crystals showed a reduction in metallic contamination as follows:

TABLE II

*Spectrographic analysis of xanthate purified ammonium perrhenate crystals*

[Composition in terms of percent weight]

| | | |
|---|---|---|
| Ag—not detected | Hg—not detected | Rh—not detected |
| Al—less than .0005 | In—not detected | Ru—not detected |
| As—not detected | Ir—not detected | Sc—not detected |
| Au—not detected | K—less than .005 | Si—less than .0005 |
| B—not detected | La—not detected | Sn—not detected |
| Ba—less than .001 | Li—not detected | Sr—not detected |
| Be—not detected | Mg—less than .0005 | Ta—not detected |
| Bi—not detected | Mn—not detected | Te—not detected |
| Ca—less than .0001 | Mo—not detected | Th—not detected |
| Cd—not detected | Na—less than .005 | Ti—less than .0001 |
| Ce—not detected | Nb—not detected | Tl—not detected |
| Co—not detected | Ni—not detected | U—not detected |
| Cr—not detected | Os—not detected | V—not detected |
| Cs—not detected | P—not detected | W—not detected |
| Cu—less than .0005 | Pb—not detected | Y—not detected |
| Fe—less than .0005 | Pd—not detected | Zn—not detected |
| Ga—not detected | Pt—not detected | Zr—not detected |
| Ge—not detected | Rb—not detected | |
| Hf—not detected | Re—principal constituent | |

While ammonium perrhenate is a desirable end product, it will be obvious that other rhenium salts and compounds may be obtained, either directly from the intermediate solution of ammonium perrhenate and ammonium sulfate or from further chemical treatment of the ammonium perrhenate crystals, and that such salts and compounds may be subjected to purification by xanthate precipitation in accordance with the foregoing.

As afore-indicated, it may be desirable to add metallic ions, such as copper ions, to the perrhenate solution prior to the addition of the precipitant in order to insure the bringing down of various other metallic elements with the insoluble xanthate. For that matter, it will often be found desirable to add copper ions or ions of some other metal which forms an insoluble xanthate to any contaminated rhenium-containing solution in which little or no such ions are present, because of the propensity of the insoluble, metal xanthate to bring down other metallic contaminants not ordinarily affected by xanthate precipitants.

Having removed essentially all of the metallic contaminants, the ultra-purified ammonium perrhenate is usually converted directly to rhenium metal powder, as by reducing it at an elevated temperature in a reducing atmosphere of hydrogen. The powder produced in this manner is compacted and sintered, whereupon it may be worked for various purposes.

As mentioned hereinbefore, the xanthate precipitation procedure may be applied to the purification of scrap resulting from working of the rhenium metal. We have found that such scrap rhenium metal is not suitable for reworking, because of contaminants picked up during the working.

The scrap metal is converted to an ammonium perrhenate solution in any suitable manner, for example, by burning such scrap metal in an oxidizing atmosphere to convert it to rhenium oxide, dissolving the rhenium oxide in water to form perrhenic acid, and neutralizing the perrhenic acid with ammonium hydroxide.

The resulting ammonium perrhenate solution is directly treated with the xanthate precipitant in the manner aforedescribed to remove metallic contaminants. It is then filtered, and the filtrate subjected to evaporation and cooling to crystallize out ammonium perrhenate of exceptionally high purity.

Whereas this process is here illustrated and described with respect to preferred specific practice, it should be understood that various changes may be made by those skilled in the art, without departing from the essential inventive contributions set forth herein and defined by the following claims.

We claim:

1. A process for removing various metallic contaminants from an aqueous, non-acid, rhenium-bearing solution while leaving the rhenium in solution, comprising introducing a water soluble xanthate salt conforming to the formula

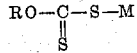

(where R is an alkyl group and M is any metal which forms a water-soluble xanthate) into said solution in an amount stoichiometrically in excess of the amount of said various metallic contaminants present therein, to bring down said contaminants as xanthate precipitate; and separating the purified rhenium-bearing solution from said xanthate precipitate.

2. The process of claim 1, wherein the xanthate salt is an alkali alkyl xanthate.

3. The process of claim 2, wherein the xanthate salt is sodium ethyl-xanthate.

4. A process for purifying ammonium perrhenate, comprising forming an aqueous solution of said perrhenate; introducing a water soluble xanthate salt conforming to the formula

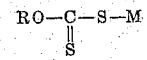

(where R is an alkyl group and M is any metal which forms a water-soluble xanthate) into said solution in an amount stoichiometrically in excess of the amount of said various metallic contaminants present therein, to bring down said contaminants as xanthate precipitate; and separating the purified rhenium-bearing solution from said xanthate precipitate.

5. The process of claim 4, wherein the xanthate salt is an alkali alkyl xanthate.

6. The process of claim 5, wherein the xanthate salt is sodium ethyl-xanthate.

7. A process for removing various metallic contaminants from an aqueous, non-acid, rhenium-bearing solution while leaving the rhenium in solution, comprising introducing into said solution ions of a heavy metal which, when reacted with a water soluble xanthate, will form a water-insoluble metal xanthate; introducing a water soluble xanthate salt conforming to the formula $$RO-\underset{\underset{S}{\|}}{C}-S-M$$

(where R is an alkyl group and M is any metal which forms a water-soluble xanthate) into said solution in an amount stoichiometrically in excess of the amount of said heavy metal ions and said various metallic contaminants present therein, to bring down said heavy metal ions and said contaminants as xanthate precipitate; and separating the purified rhenium-bearing solution from said xanthate precipitate.

8. The process of claim 7 wherein the heavy metal ions are copper.

9. The process of claim 8, wherein the xanthate salt is an alkali alkyl xanthate.

10. The process of claim 9, wherein the xanthate salt is sodium ethyl-xanthate.

11. A process for purifying scrap rhenium metal containing various metallic contaminants, comprising forming an ammonium perrhenate solution from said scrap metal; introducing a water soluble xanthate salt conforming to the formula $$RO-\underset{\underset{S}{\|}}{C}-S-M$$

(where R is an alkyl group and M is any metal which forms a water-soluble xanthate) into said solution in an amount stoichiometrically in excess of the amount of said various metallic contaminants present therein, to bring down said contaminants as xanthate precipitate; separating the purified rhenium bearing solution from said xanthate precipitate; crystallizing ammonium perrhenate from said solution; separating the ammonium perrhenate crystals from the mother liquor; and producing new rhenium metal from said ammonium perrhenate crystals.

12. The process of claim 11, wherein the xanthate salt is sodium ethyl-xanthate.

References Cited in the file of this patent
UNITED STATES PATENTS 2,876,065    Zimmerley et al. _____ Mar. 3, 1959

OTHER REFERENCES

Fisher et al.: "Chemical Abstracts," vol. 46, col. 11029 (1952).

Martell et al.: "Chemistry of the Metal Chelate Compounds," publ. by Prentice-Hall, Inc., New York (1952) (page 503 relied on).

Hampel: "Rare Metals Handbook," publ. by Reinhold Publ. Corp., New York (1954) (pages 355–356 relied on).